United States Patent [19]
Konstant

[11] Patent Number: 5,476,180
[45] Date of Patent: Dec. 19, 1995

[54] CART RETURN DEVICE

[75] Inventor: Anthony N. Konstant, Winnetka, Ill.

[73] Assignee: Konstant Products, Inc., Skokie, Ill.

[21] Appl. No.: 237,441

[22] Filed: May 3, 1994

[51] Int. Cl.[6] ............................................. A47F 5/00
[52] U.S. Cl. .................. 211/151; 211/59.2; 414/276; 414/286
[58] Field of Search .................. 211/59.1, 151, 211/162; 414/276, 286

[56] References Cited

U.S. PATENT DOCUMENTS

| | | |
|---|---|---|
| 266,301 | 10/1882 | Morris . |
| 2,798,267 | 7/1953 | Anderson . |
| 2,880,024 | 3/1959 | Hewitt . |
| 3,021,795 | 2/1962 | Hayba et al. . |
| 3,399,784 | 9/1968 | Buchhinder et al. . |
| 3,465,894 | 9/1969 | Setecka . |
| 3,757,967 | 9/1973 | Colbridge . |
| 4,155,462 | 5/1979 | Bendel . |
| 4,341,313 | 7/1982 | Doring . |
| 4,462,500 | 7/1984 | Konstant et al. . |
| 4,613,270 | 9/1986 | Konstant et al. . |
| 4,687,404 | 8/1987 | Seiz et al. . |
| 4,955,489 | 9/1990 | Allen . |
| 5,170,896 | 12/1992 | Konstant .............................. 211/151 |

*Primary Examiner*—Robert W. Gibson, Jr.
*Attorney, Agent, or Firm*—Niro, Scavone, Haller & Niro

[57] ABSTRACT

A cart return device that uses a two-tiered rail system having a set of parallel feed and return rails, which include transfer ramps for the transfer of a cart from rolling engagement with the feed rails to the return rails. The device being adapted to include a lifting apparatus and a liftable support that transfers an unloaded cart from the return rails to the feed rails where it can be reloaded in a single step. The device further adapted to provide a cart return system that uses the weight of a loaded pallet and cart as the source of power for driving the lifting apparatus that raises the cart up to the feed rails and into a position where the empty pallet can be removed or reloaded in a single operation.

25 Claims, 6 Drawing Sheets

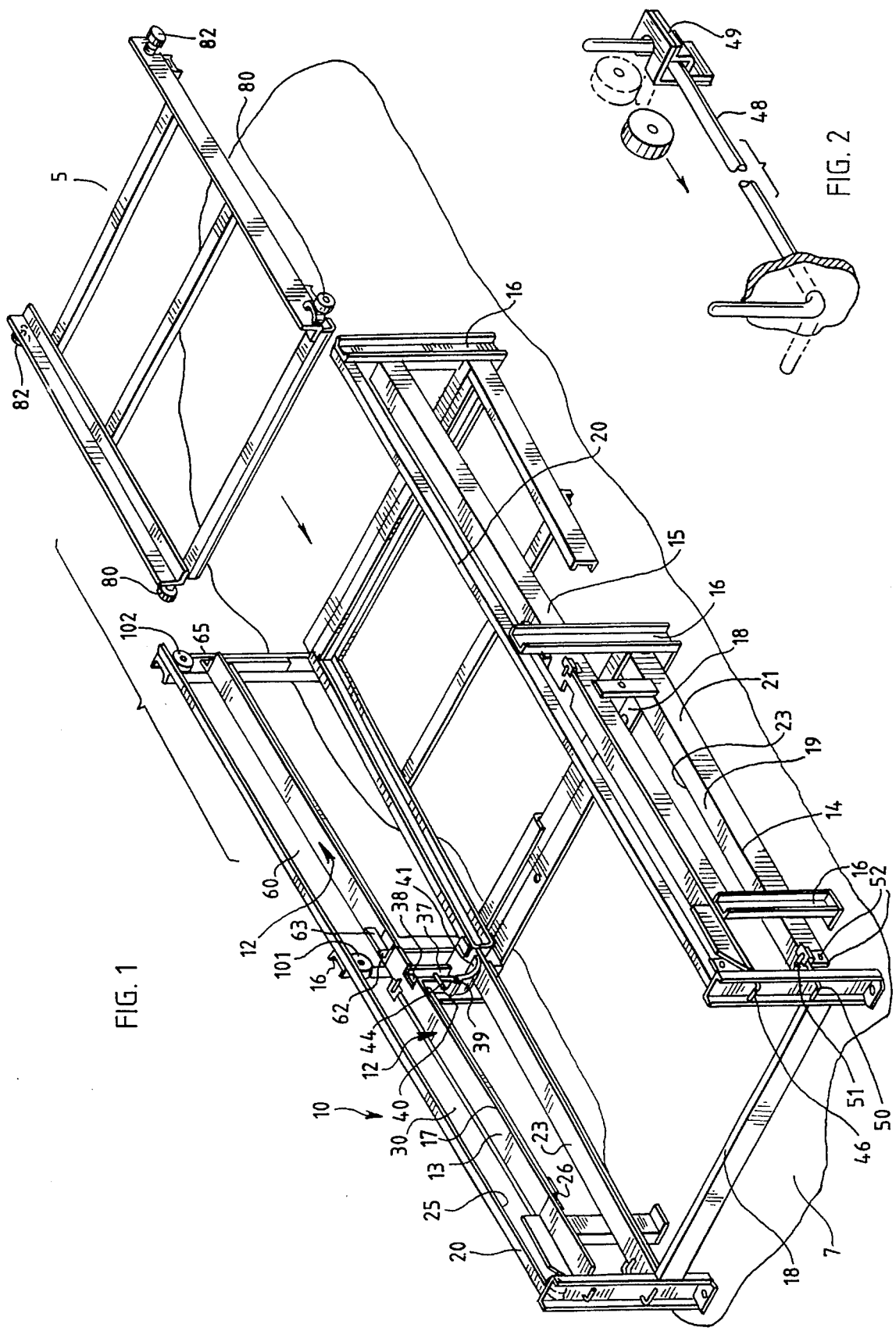

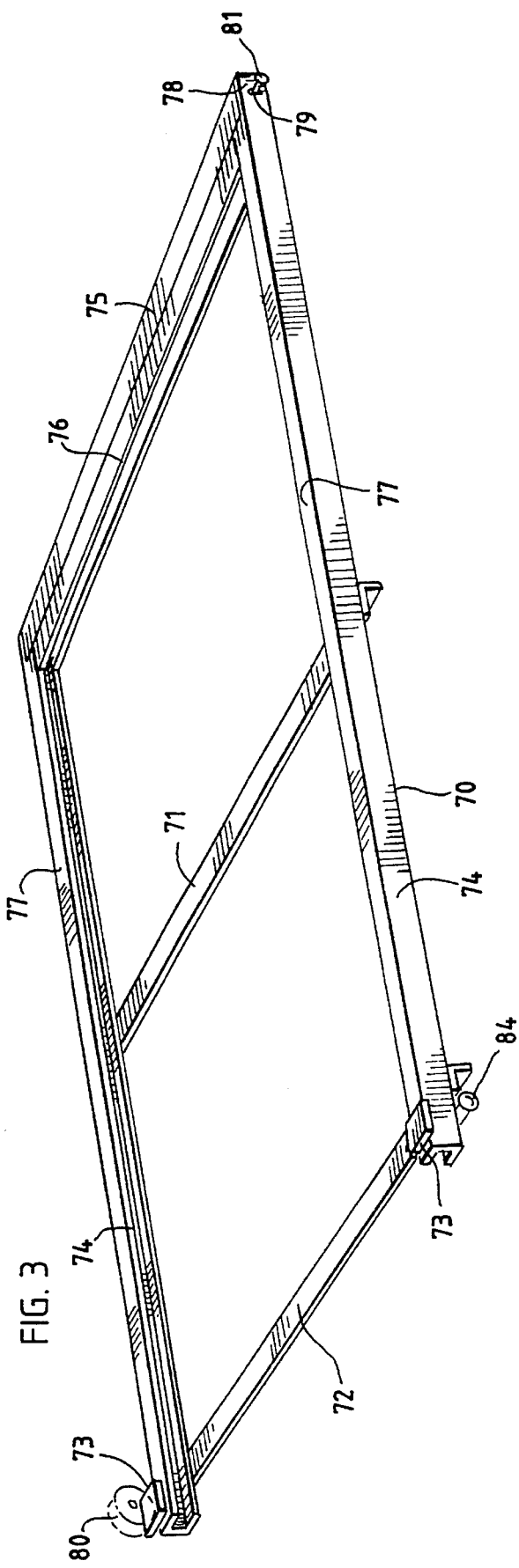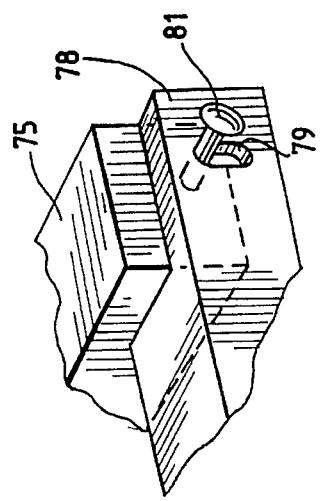

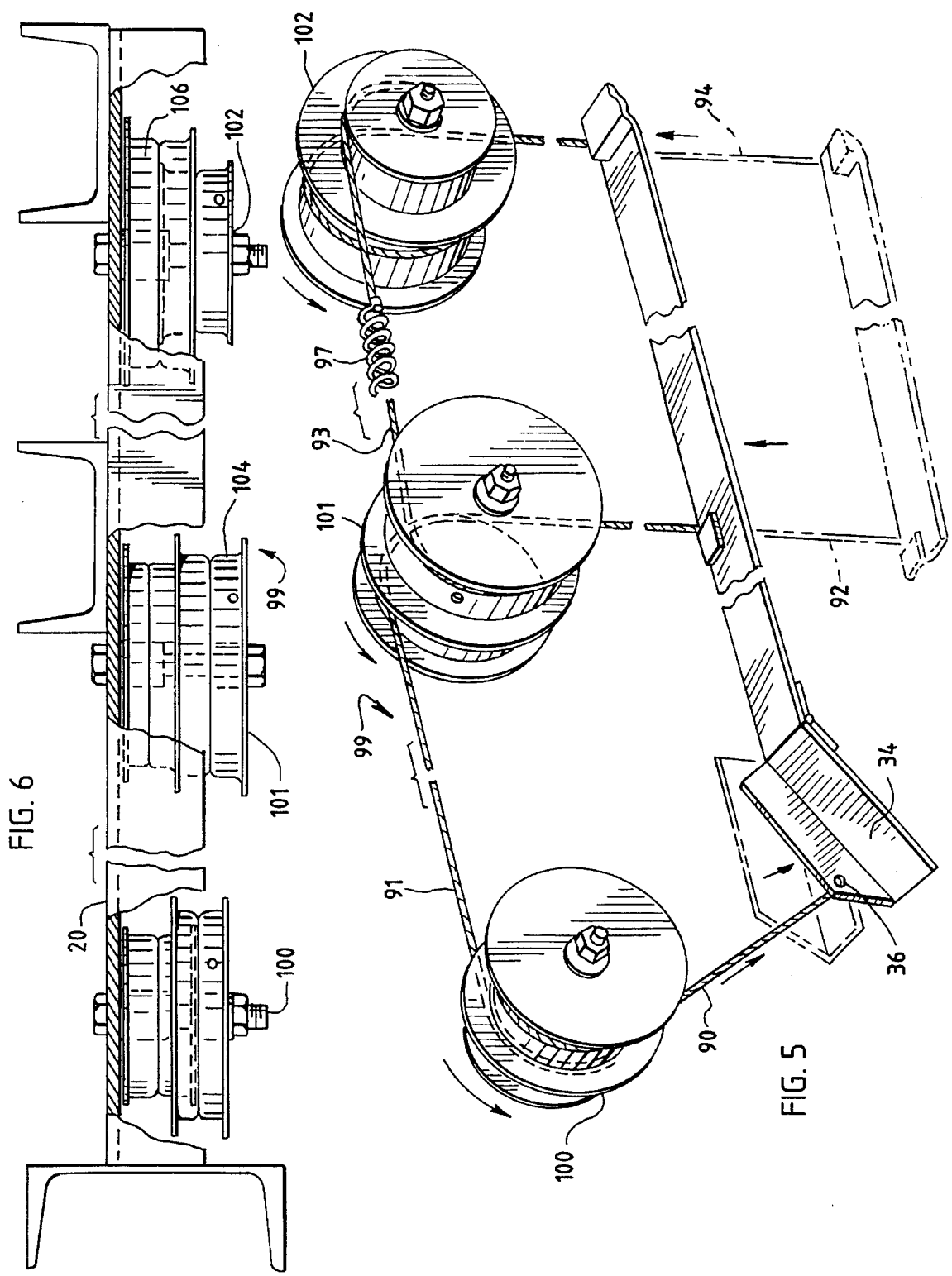

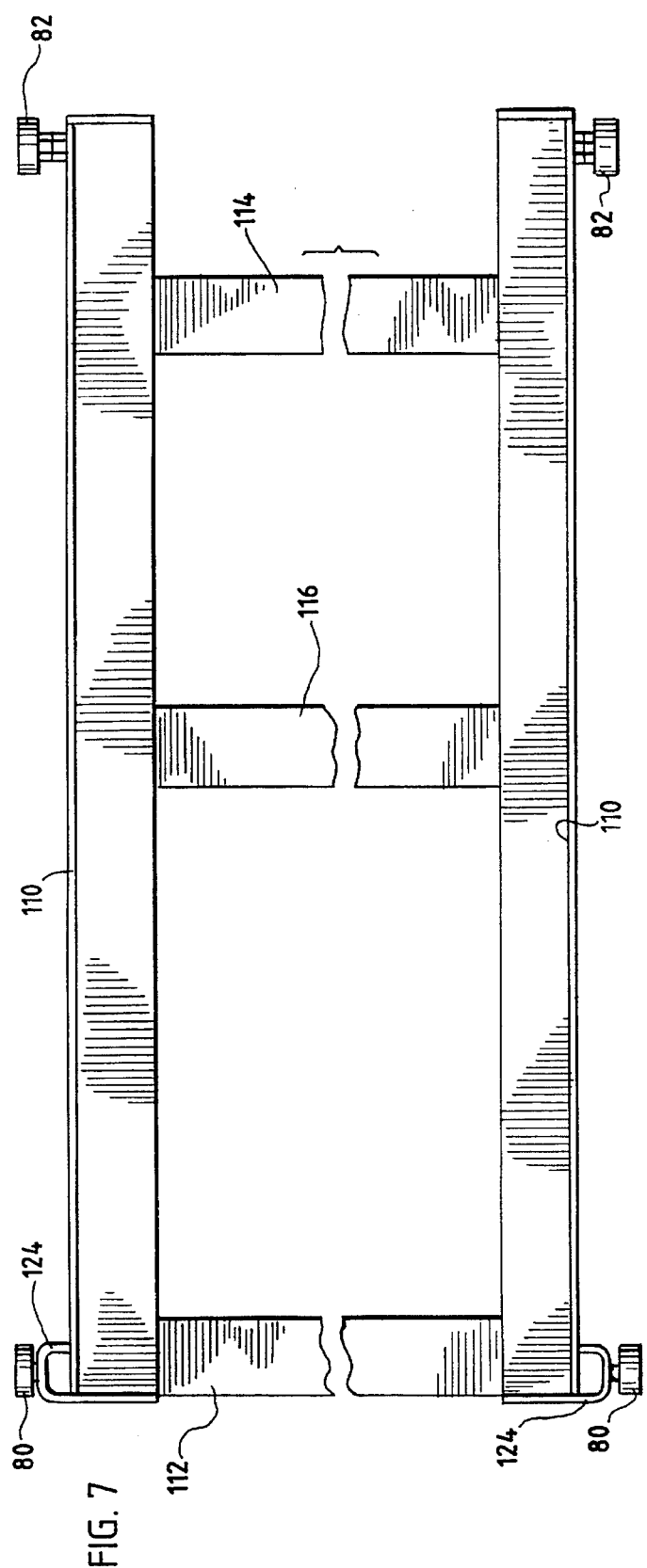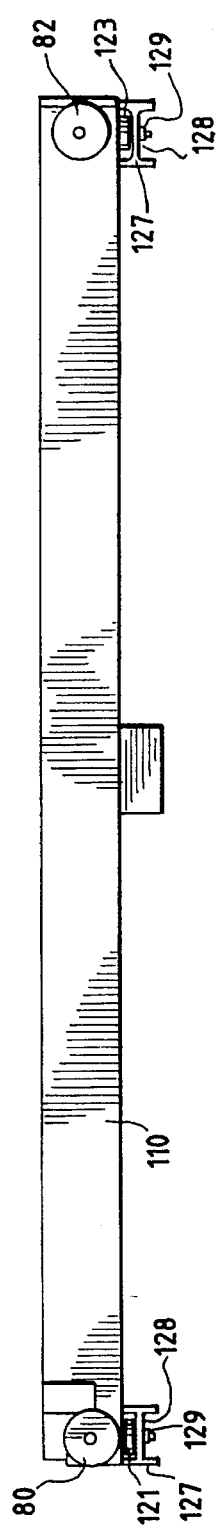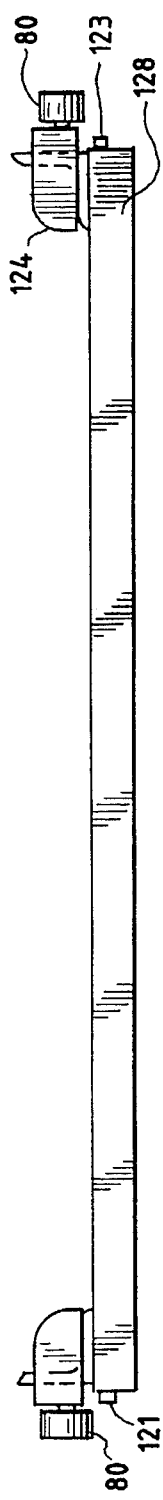

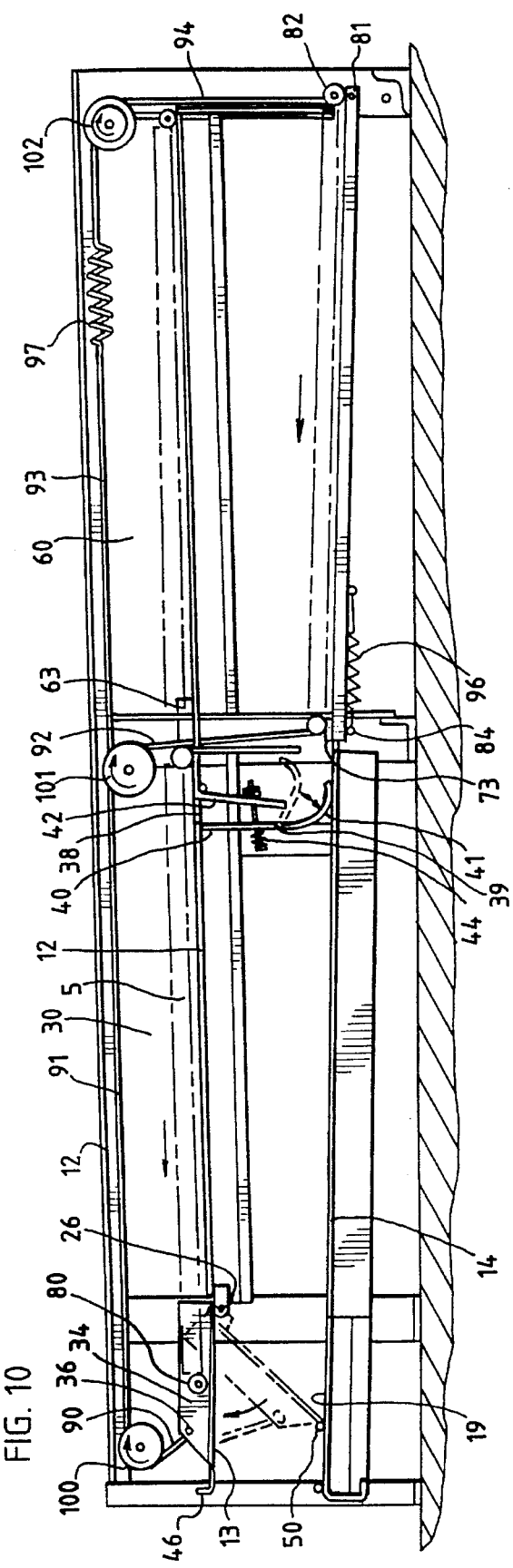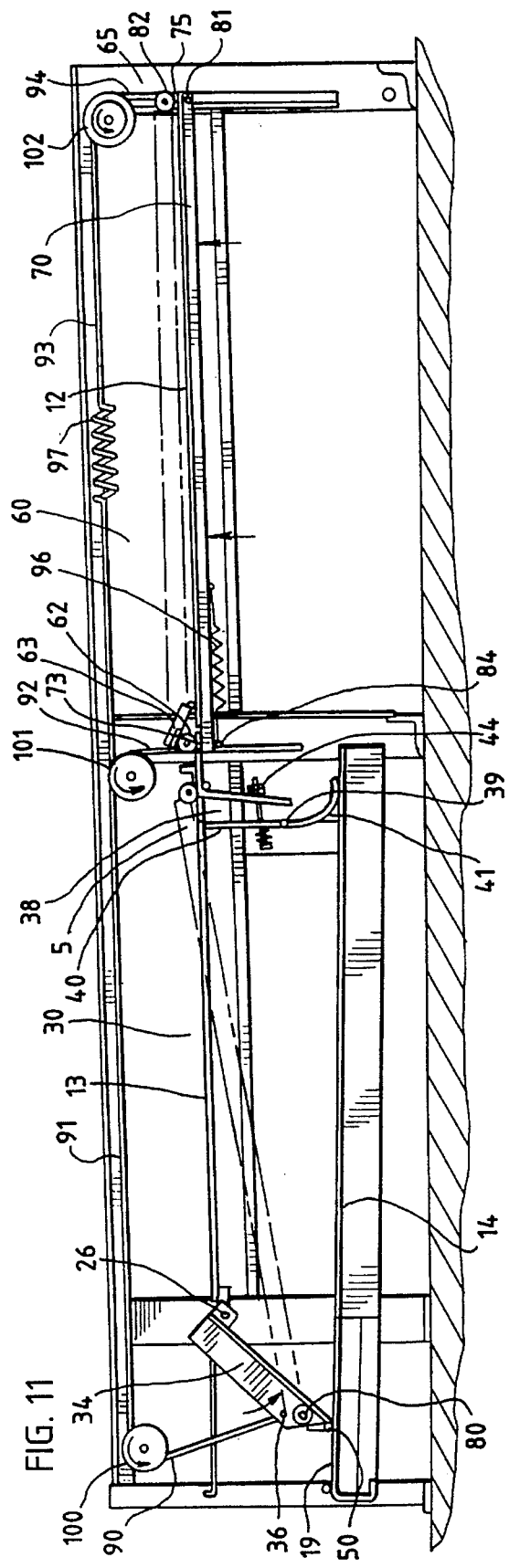

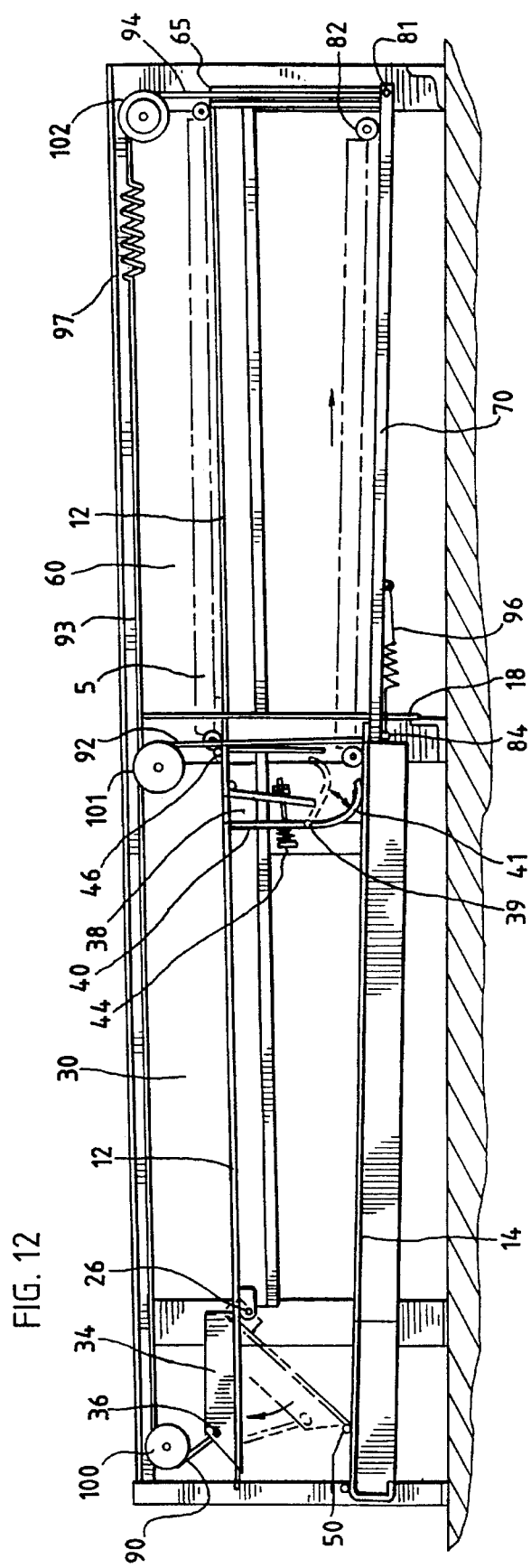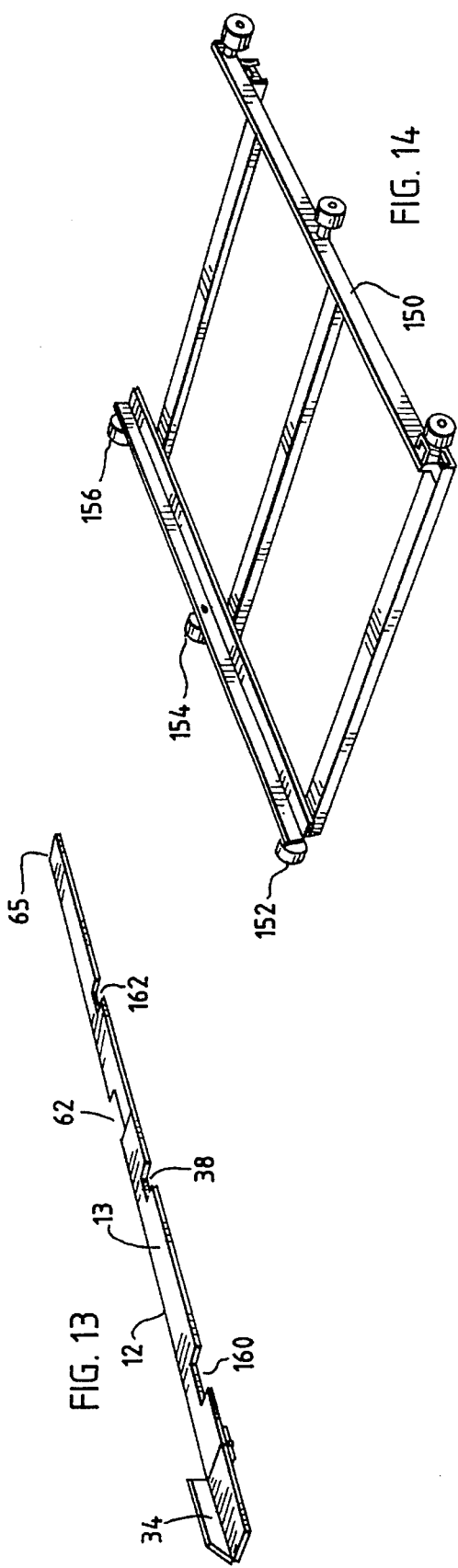

CART RETURN DEVICE

BACKGROUND OF THE INVENTION

The present invention relates generally to rack storage systems, and more particularly, to a cart return system that selectively and automatically cycles carts carrying unit loads, such as palletized loads, to the front of the system for unloading and then cycles the cart and unloaded pallet to their original position at the rear of the system in a single operation.

An important consideration in the storage or warehouse industry is the ability to safely and efficiently load and unload stored products while maintaining the highest possible storage density within a particular storage area. Another important consideration is whether the system can operate under the first in, first out inventory basis.

One such system is described in my U.S. Pat. No. 5,170,896 which is entitled "pallet return pallet rack system." In that system, two sets of rails, one located above the other, are used to cycle carts carrying pallets back and forth in the system. A cart with a loaded pallet is located at the front end of the system on the upper feed rails until the pallet is unloaded. A transfer mechanism is employed which enables the now unloaded pallet and cart to be transferred to a lower set of return rails which transport the cart to the rear of the system. Once the unloaded pallet and cart are transferred to the return rails, a loaded pallet and cart advance to take their place at the front of the system.

To continue the cycle, the unloaded pallet must first be removed by warehouse personnel from the cart on the return rails. The cart must then be placed on the upper feed rails, where a new loaded pallet can be added. Alternately, the unloaded pallet and cart can be removed and placed on the feed rails. The unloaded pallet must then be removed before a new loaded pallet can be added to the cart.

While unloading the pallet from the cart can be done in an efficient single step in this system, reloading cannot. As was discussed, reloading requires the removal of the unloaded pallet and the lifting of the cart to the feed rails before a new loaded pallet can enter the cycle, thus, limiting the efficiency of the system.

SUMMARY OF THE INVENTION

The present invention preserves the advantages of my pallet return pallet rack system and provides new features and advantages not found in the previous invention. Specifically, my current invention improves my pallet return pallet rack system invention by providing a cart return system that allows the reloading procedure to be performed in a single, efficient operation that does not require warehouse personnel to transfer the unloaded cart to the feed rails for reloading.

In one embodiment of the invention, a cart return device is provided which includes a two-tiered rail system that has been adapted to include an upper set of feed rails that cycle carts carrying unit loads from the back of the system to the front of the system for unloading. Once the cart is unloaded, ramps transfer the cart from the feed rails to the lower set of return rails where the cart then moves to the back of the system and onto a liftable support. A lifting apparatus then lifts the cart and support up to the feed rails where the cart is then transferred to the feed rails for reloading.

In another embodiment of the invention, the system uses the weight of the cart and a unit load as the source of power to lift the unloaded cart up to the feed rails. This is accomplished by having the weight of the loaded cart depress a set of hinged transfer ramps which are, in turn, connected to a lifting apparatus which may include interconnected sets of cables and pulleys, chains and sprockets, or gears and shafts. As the transfer ramps are depressed, the lifting apparatus raises the liftable support and unloaded cart up to the feed rails for reloading. In yet another embodiment, the liftable support may raised by an electric motor or hydraulic system.

It should also be understood that persons of ordinary skill in the art would recognize that my invention would apply and be useful in other warehousing applications in which a pallet is not used. For example, my invention would also be useful in cycling mean loads, slip-sheet loads, containers, barrels and other types of unit loads which are employed in a warehousing system.

Therefore, an object of the present invention is to provide a cart return system which improves the efficiency and safety of a warehouse system by eliminating the need to lift a cart from the lower return rails to the upper feed rails.

Another object of the present invention is to provide a cart return system where unloaded, wheeled carts are selectively returned from an unloading end to a reloading end where a new load can be added in a single operation without the operator having to physically remove the cart.

Another object of my invention is to provide a cart return system which can forwardly advance non-pallet loads including, but not limited to, slip-sheet loads, mean loads, containers, barrels and other unit loads employed in a warehouse system.

Another object of the present invention is to provide a cart return system that transfers unloaded carts from an unloading end and returns them to a reloading end where they may be conveniently stored, repositioned or re-used.

An additional object of the present invention is to provide a cart return system that can store loads of multiple depths in a first in, first out inventory basis and transfers unloaded carts for subsequent reloading from a different access aisle.

A further object of the present invention is to provide a cart return system in which a lifting apparatus lifts a cart from a down position to an up position whereby that cart is transferred from the return rails to the feeds rails for reloading.

Still another object of the present invention is to provide a cart return system where the lifting apparatus, in a cost efficient manner, uses the weight of a cart and unit load to provide the power necessary to lift an unloaded cart up to the feed rails for transfer and reloading.

Still an additional object of the present invention is to provide a cart return system having wheeled carts that securely retain pallets during loading and during the transfer of the carts from the unloading end to the reloading end.

Still a further object of the present invention is to transfer and return unloaded carts to a reloading position without interfering with the rolling relationship and/or lateral alignment of the carts on the upper feed or lower return pair of rails.

Yet another object of the present invention is to provide protection for the wheels of the carts during all phases of operation, and to provide a guide means to keep the carts in proper alignment during all phases of operation.

Yet an additional object of the present invention is to provide a cart return system that can be used in combination with multiple rack systems, and that can be used in conjunction with other types of storage systems.

Yet a further object of the present invention is to provide a cart return system that is safer, easier to use, and more efficient than known storage systems.

BRIEF DESCRIPTION OF THE DRAWINGS

These and other features, objects and advantages of the present invention will become apparent from the following description and drawings wherein like reference numerals represent like elements in the several views, and in which:

FIG. 1 is a perspective view of the present invention with portions removed to reveal aspects of the invention;

FIG. 2 is an exploded perspective view of the cart stop;

FIG. 3 is a perspective view of the liftable support and also shows how the front wheel of a cart rests upon the pads;

FIG. 4 is a detailed view showing how the extendable member is raised above the elevation of the support through the interaction of the pins and slots;

FIG. 5 is an exploded perspective view showing the workings of a lifting apparatus which uses interconnected cables and pulleys.

FIG. 6 is a plan view of the tandem pulley assemblies;

FIG. 7 is a plan view of a cart of the present invention;

FIG. 8 is a side view of the right-hand side of a cart of the present invention;

FIG. 9 is a front view of a cart of the present invention;

FIG. 10 is a side view of the left-hand side of the invention showing a loaded cart engaging and depressing the first transfer ramps and a cart at rest on the support in the down position prior to being lifted up to and transferred to the feed rails;

FIG. 11 is a side view of the left-hand side of the invention showing the interaction between a loaded cart and the first transfer ramps as well as an unloaded cart in a position before it is transferred to the feed rails for reloading;

FIG. 12 is a side view of the left-hand side of the invention showing a cart that has been completely transferred to the return rails and is moving into position where it will come to rest on the liftable support and a cart that has been completely transferred to the feed rails and is locked into position by the cart stop;

FIG. 13 is a perspective view of a cart employing three in-line wheels; and

FIG. 14 is a perspective view of a feed rail which has been adapted to use a cart having three in-line wheels.

DETAILED DESCRIPTION OF THE PREFERRED EMBODIMENTS

The cart return system of the present invention may be arranged in a variety of configurations. It may be stacked one on top of another as part of a rack structure (not shown), or installed in side-by-side relationship within a single storage bay (not shown). As used herein, and as shown on FIG. 1, front end 7 refers to an unloading end which is generally associated with an aisle for workers and equipment used to unload pallets from the rack (not shown). The rear end 8, as used herein, refers to a loading or reloading end which is also generally associated with an aisle for workers and equipment used in loading or reloading (not shown).

In accordance with a preferred embodiment such as shown in FIG. 1, my cart return system consists of at least one cart 5 and at least one two-tiered cart return system 10. Cart return system 10 includes pair of spaced, parallel feed rails 12 which have rolling surfaces 13, webs 15, and guide edges 17. Cart return system 10 also has at least one pair of spaced, parallel return rails 14, which further include rolling surfaces 19, webs 21, and guide edges 23. Feed rails 12 are positioned above return rails 14 and are sloped upwardly from the front end 7 to the rear end 8 at a gradual angle. Return rails 14 are sloped downwardly from the front end 7 to the rear end 8 at a gradual angle.

Rails 12 and 14 are secured in place by upright columns 16 and cross beams 18 which are generally located below return rails 14. Support is also provided by at least one set of parallel beams 20 which are located above feed rails 12 and include webs 25. Extra support for the system 10 can be provided by using a greater number of upright columns, cross and parallel beams as will be understood by those of skill in the art. Further strength and rigidity is provided by fastening webs 15 and 21 to upright columns 16.

FIG. 1 shows a left-hand portion (when viewed from the unloading or front end) of cart system 10, and it will be readily understood by those of ordinary skill in the art that the right-hand portion of cart system 10 is a mirror image of the left-hand portion. In addition, although angle member, channels and I-beams are shown for the elements in the preferred embodiments, it will be readily understood that other structural members having different cross-sectional shapes may be employed to practice the inventions.

As further shown in FIG. 1, feed rails 12 are subdivided into first sections 30, which are generally located at front end 7, and second sections 60, which are generally located at rear end 8. First sections 30 contain hinges 26 which form first transfer ramps 34 having cable attachment pins 36 (shown in FIGS. 10–12). Located further back from transfer ramps 34 on rails 12 are notches 38, second transfer ramps 40, which contain ramp hinges 39, and curved portions 41. Opposingly located across from second transfer ramps 40 on rails 12 are hinged dampeners 37. Hinged dampeners 37 are biased toward second transfer ramps 40 by spring bolts 44.

Rear notches 38 are depth-proportioned to permit a pair of front wheels 80 of cart 5 to roll forward on riding surfaces 13 of feed rails 12, past and unobstructed by rear notches 38. The distance between the front most portion of front transfer ramps 34 and rear notches 38 should be slightly greater than the distance between front wheels 80 and rear wheels 82 of cart 5. In this manner, cart 5 may move from rolling engagement with feed rails 12 to rolling engagement with return rails 14.

As shown in FIGS. 1 and 2, rail system 10 further includes feed rail stops 46 which include rotatable rods 48 and rod brackets 49 which are attached to webs 15 of feed rails 12. Feed rail stops 46 are positioned to prevent front wheels 80 from proceeding past notches 38 and to first transfer ramps 34 when in the engaged position. Return rail stops 50,-which are of the same construction as stops 46, include rods 51, brackets 52 and are attached at webs 21 of return rails 14. Return stops 50 engage front wheels 80 and prevent cart 5 from leaving first transfer ramps 34 and rolling down return rails 14 when in the engaged position.

Although rolling surfaces 13 are maintained in the same angled plane, first sections 30 and second sections 60 are separated by first transfer apertures 62. Second sections 60 are secured by fastening the rails to additional upright columns 16 which, in turn, are secured by cross and parallel beams 18 and 20.

In order to maintain the continuity of rolling surfaces 13 across first transfer apertures 62 so that cart 5 can travel from rear end 8 of the system to front end 7 along feed rails 12, swing bridges 63 are employed on second sections 60. Swing bridges 63 are hinged and when in a down position maintain the continuity of rolling surfaces 13 along a depth that corresponds to that of rear wheels 82 and notches 38. When engaged by cart 5 as it is transferred from the return rails to the feed rails, bridges 63 swing up to allow for the unobstructed passage of cart 5 through first transfer apertures 62.

Feed rails 12 of second sections 60 terminate near rear end 8 to form second transfer apertures 65. The overall lengths of second sections 60 are less than the distance between wheels 80 and 82 of cart 5 and less than liftable support 70 which will be discussed below. It will also be understood by those skilled in the art that the lengths of first sections 30 will vary according to the number of carts to be used on the system. To increase the number of carts to be used, the distance between notches 38 and first transfer apertures 62 can be extended to any desired length.

As further shown in FIG. 1, located below second sections 60 of feed rails 12 and rearward of return rails 14 is liftable support 70. As shown in detail in FIG. 3, liftable support 70 can be a frame constructed from a number of well-known structural members, such as angle members. Moreover, liftable support 70 may be a platform, brackets, beams and other structures which would be understood and recognized by those of ordinary skill in the art.

Support 70 includes front member 72 with raised pads 73 that provide elevated surfaces upon which front wheels 80 rest. When pads 73 are raised with support 70, they are located in a position on support 70 which allows them to pass through first transfer apertures 62. Parallel side members 74 connect front member 72 to rear member 76 and have rolling surfaces 77, which are located in positions which allow rear wheels 82 to travel along their surface. Parallel side members further include extended side flanges 78 containing slots 79. Support 70 can be further strengthened by including additional cross members 71.

As shown in FIG. 4, located between flanges 78 is extendable member 75 upon which rear wheels 82 rest. Extendable member 75 is held in position by opposingly located cable attachment pins 81 that run from extendable member 75 through slots 79. Also, opposingly located on the outer corners of support 70 below pads 73 are cable attachment pins 84.

As shown in FIGS. 5 and 6, lifting apparatus 99 includes a plurality of interconnected cables, springs and tandem pulleys. Attached to pins 36 of front transfer ramps 34 are cables 90 which are, in turn, attached to first tandem pulleys 100. First tandem pulleys 100 are attached to parallel beams 20 above transfer ramps 34 at the front end of the cart return system. Cables 91 then connect first tandem pulleys 100 to second tandem pulleys 101 which, in turn have cables 92 and springs 96 which are connected to front pins 84 of support 70 (shown in FIGS. 10–12). Second tandem pulleys 101 are located above first transfer apertures 62 on parallel beams 20. Cables 93 and springs 97 then connect second tandem pulleys 101 with third tandem pulleys 102, which are connected by cables 94 to rear pins 81 of support 70 (not shown). Third tandem pulleys 102 are located near rear end 8 on parallel beams 20.

As further shown in FIG. 1, the pulleys and cables are generally located on webs 25 of parallel beams 20. This is desirable for both safety reasons and to prevent the inadvertent ensnarement of the cables and pulleys by warehousing machinery.

The details of cart 5 may best be seen with reference to FIGS. 7–9. The frame of cart 5 consists of side angle members 110, front member 112, rear member 114 and any additional number of cross members 116 that may be necessary to support a given load. Side members 110 are secured to cross members 112, 114 and 116, which together form the load bearing surface of cart 5.

As indicated, cart 5 includes a pair of front wheels 80 and a pair of rear wheels 82. Front wheels 80 are rotatably mounted to a front portion of side angles 110 by brackets 124. In addition to mounting front wheels 80 to side members 110, brackets 124 also serve to extend the front wheels 80 laterally outside the width of cart 5 a distance greater than rear wheels 82 an amount sufficient for the front wheels 80 to roll forward on rolling surfaces 13 of feed rails 12 without interference from or passing through rear notches 38. Brackets 124 may be configured to further serve, if desired, to retain a pallet (not shown) on the cart frame during the return phase of operation as hereinbefore and hereinafter described.

Moreover, persons of ordinary skill in the art would understand that my invention could be used in other applications in which a pallet is not used. Accordingly, cart 5 could be adapted for use with mean loads, slip-sheets, containers, barrels and other types of unit loads used in a warehouse system.

Rear wheels 82 are rotatably mounted to side channels 110 and are spaced such that when rear wheels 82 are in rolling engagement with upper rolling surfaces 13, they will intersect rear notches 38, when desired. Cart 5 may be further provided with a pair of front guide wheels 121 and a pair of rear guide wheels 123 (see FIG. 8). Front guide wheels 121 and rear guide wheels 123 are positioned adjacent to the guide edges 17, keeping cart 5 in proper lateral alignment and providing smooth operation as cart 5 rolls along feed rails 12. Similarly, when cart 5 is transferred to and in rolling engagement with return rails 14, guide wheels 121 and 123 cooperate with guide edges 23, providing proper lateral alignment and smooth operation of cart 5 as it rolls along return rails 14.

As best shown in FIG. 8, front and rear guide wheels 121 and 123 may be secured to cart 5 using a structural steel member having an "I" or "H" cross-section which includes a flange portion 127 and web portion 128. Flange portion 127 is secured to front beam 112 and side member 110. In this manner, web portion 128 is positioned to rotatably secure an axle 129 of front guide wheels 121. In like manner, the rear guide wheels 123 are secured to cart 5. Additional support may be provided by adding a plate (not shown) to aid in securing the structural member to beams 112 and/or side members 110. A similar plate may also be provided to the rear of rear guide wheels 123 (not shown). In this manner, the front and rear guide wheels 121 and 123 are protected as cart 5 moves along feed rail 12, during transfer and as cart 5 moves along return rail 14. Flange portion 127 may extend slightly beyond the guide wheels 121 and 123 to protect the guide wheels from damage. Such a configuration does not interfere with smooth operation and transfer, since there may be a limited amount of play between the guide wheels 121 and 123 and the guide edges 17 and 23. In addition, the guide wheel assemblies may act as legs for cart 5 when it is on the ground or other flat surface and also serve to raise the cart to permit easy access by a fork lift or similar device during loading or unloading.

It will be apparent to those of ordinary skill in the art that there are other methods to guide the cart during operation as well as to attach guide wheels 121 and 123 to cart 5 with other structure members while still achieving the desired guiding functions. For example, fixed guides (not shown) may be used which may be affixed along the sides of cart 5 or elsewhere, in a location to provide the desired guiding function. Nylon, teflon or similar pads or strips may be employed, if desired. Accordingly, the various guide elements described herein, as well as equivalent means, may be used alone or in combination to achieve the desired and automatic guide function during transfer and for proper lateral alignment as cart 5 rides on rails 12 and 14. Although the present invention may be practiced without the use of guides, guides are generally preferred.

The operation of my invention may be better understood by reference to FIGS. 10–12. In this embodiment, at least two carts are needed to cycle through the system, although my invention could easily accommodate a greater number of carts. As shown in FIG. 12, a pallet is loaded upon cart 5 while it is at rest on the feed rails 12 of second sections 60. Feed rail stops 46 prevent any forward movement of cart 5 along the downward slope of feed rails 12. At the same time, an unloaded cart will be sitting upon support 70 which is in its down position and being supported by cross beam 18 and cables 94.

As shown in FIGS. 10 and 11, when stops 46 are disengaged, cart 5 rolls forward down feed rails 12 and front wheels 80 roll past notches 38. Once front wheels 80 pass hinge 26 and begin traveling along rolling surfaces 13 of first transfer ramps 34, the weight of the loaded pallet and cart causes transfer ramps 34 to move in a downwardly direction towards return rails 14. First transfer ramps 34 eventually come to rest on rolling surfaces 19.

As shown in FIG. 11, return rail stops 50, engage front wheels 80 before they can roll off the incline of first transfer ramps 34 which preserves the cart's ability to continue its forward movement and also prevents support 70 from returning to a down position. Return rail stops 50 also engage front wheels 80 before rear wheels 82 can enter notches 38.

The downward movement of first transfer ramps 34 engages lifting apparatus 99 by causing cable pins 36 to pull first cables 90 in a downward direction. Since cables 90–94, springs 96–97, and pulley tandems 100–102, are all interconnected they move in unison. Consequently, when cables 90 are pulled downward, cables 92 and 94 are arranged on pulleys 101 and 102 so that they are pulled in an upward direction. Since support 70 is attached to lifting apparatus 99 by cables 92 and 94, it too, is pulled upward until reaching its upright position where the upper surfaces of side members 74 engaging feed rails 12 and any further movement is prevented.

As shown in FIG. 11, as front wheels 80 and brackets 124 are raised and begin to pass through first transfer apertures 62, brackets 124 engage swing bridges 63 which hinge upward to allow the passage of cart 5. Even though support 70, as indicated, will come to rest under feed rails 12 and rolling surfaces 13, because the front wheels are located upon pads 73 they will be elevated to a position either level with or slightly above rolling surfaces 13. Leaving front wheels at a point below rolling surfaces 13 will cause feed rails 12 to act as impediments against the cart's forward movement along the downward slope of feed rails 12.

It is also important to raise rear wheels 82 level with or above rolling surfaces 13 for the same reason. This is accomplished by the use of extendable member 75, slots 79, and rear pins 81. Slots 79 are fashioned with extra depth that allows connected extendable member 75 to continue its upward movement, even after support 70 reaches its upright position, until it reaches an elevation level with or slightly above rolling surfaces 13. Thus, again, cart 5 will be able to begin rolling along the slope unobstructed.

Once cart 5 begins rolling, front wheels 80 and brackets 124 will move forward along the rolling surfaces 13 of first sections 30 until feed rail stops 46 prevent any further forward movement. This forward movement will also remove any contact with swing bridges 63 which will fall into a down position re-establishing the continuity of rolling surfaces 13 across transfer apertures 62 for the passage of rear wheels 82.

To release the cart that has been locked into position by return rail stops 50, and to lower support 70 into position to receive the cart, return stops 50 are disengaged. Since front wheels 80 are still positioned on the downward incline of transfer ramps 34, once cart 5 is released, front wheels 80 will move forward off of transfer ramps 34 and onto rolling surfaces 19 of return rails 14.

Once free from the weight of the pallet and cart 5, the weight of support 70 will cause it to drop into its down position to receive a cart. At the same time, first transfer ramps 34 will be raised to clear an unobstructed path for cart to travel along the downward slope of return rails 14.

At the same time front wheels 80 are clearing ramps 34, rear wheels 82 are moving along rolling surfaces 13 until falling into notches 38 and engaging second transfer ramps 40 and dampeners 42. Not only do dampeners 42 slow the rate of descent of rear wheels 82 to prevent any needless damage, but dampeners 40 also delay cart 5 from moving along return rails 14 until transfer ramps 34 have been lifted clear and support 70 has been properly position to receive the cart. Upon reaching curved portions 41, the downward inclines of rolling surfaces 19 and curves 41 propel cart 5 rearward until it comes to rest upon support 70 where it is in a position to be lifted onto the feed rails for reloading. Hinges 39 also enable curve portions 41 to be moved upward so as to allow for an unrestricted passage of cart 5.

The lifting and lowering performed by lifting apparatus 99 requires coordination between cables 90-94 and pulleys 100–102. When first transfer ramps 34 are depressed by the weight of loaded cart 5, the distance they will travel before stopping will be less than the distance needed to raise the front of support 70 to the upright position, which is, in turn, less than the distance the rear portion of support 70 needs to travel until reaching its upright position. The variable travel distances are the result of angling feed rails 12 and return rails 14. As shown in FIG. 6, this can be overcome by employing a lifting apparatus that uses larger pulleys 104 and 106 as part of tandem pulley sets 101 and 102, which for any set amount of rotation of tandem pulleys 100, will produce an increased amount of cable pull. Springs 96 and 97 alleviate the need to achieve precise pull lengths by absorbing any over pull that may be generated.

Conversely, when the weight of the load is removed, support 70 drops back into its down position and transfer ramps 34 are raised. It should be noted, however, that pads 73 should be either level with or slightly below rolling surfaces 19 when support 70 is in its down position. If pads 73 extend above rolling surfaces 19, they might obstruct the movement of the cart.

Alternate configurations of pulleys can be used and different lifting apparatus could be used to raise and lower support 70. For example, persons of ordinary skill in the art would recognize that sprockets and chains and gears and shafts could be substituted for the cables and pulleys. Using the weight of the loaded cart to raise and lower support 70 could also be eliminated by the use of an electric motor or a hydraulic system.

An alternate embodiment using a cart having all of its wheels in alignment is shown in FIGS. 13 and 14. In this embodiment, cart 150 has first set wheels 152, second set of wheels 154, and third set of wheel 156 which can be attached in one of the manners already described. Also included in this embodiment, as shown in FIG. 14, are additional notches 160 and 162 in feed rails 12. Notches 160 allow cart 150 to be delivered to feed rails 12 from support 70, and notches 162 permit the transfer of cart 150 to the return rails.

In the operation of this embodiment, cart 150 will remain on rolling surface 13 until properly positioned on transfer ramps 34 and over notches 38 and 160. By configuring wheels 152–156 to place two of the three sets of wheels on rolling surfaces 13 any time the other set of wheels passes over an opening, any inadvertent obstruction by the opening is eliminated. The remaining operations of this embodiment are the same as previously described.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A cart return system comprising:
   at least one set of spaced, parallel feed rails;
   at least one set of spaced, parallel return rails, positioned below said feed rails;
   at least one cart having wheels for rolling engagement with said feed rails and said return rails;
   said feed rails and said return rails adapted to allow said cart to move from rolling engagement with said feed rails to rolling engagement with said return rails; and
   a liftable support located below said feed rails and rearward of said return rails for holding said cart and lifting said cart up to said feed rails for transfer to said feed rails.

2. The device of claim 1 further including a lifting apparatus for lifting said cart from said return rails to said feed rails.

3. The device of claim 1 further adapted to use the weight of a cart, when loaded, to lift an unloaded cart up to the feed rails.

4. The device of claim 1 further including a first and second set of transfer ramps which facilitate the transfer of said cart from rolling engagement with said feed rails to rolling engagement with said return rails.

5. The device of claim 1 further including a dampener to control the descent of said cart from said feed rails to said return rails.

6. The device of claim 1 wherein said cart has a pair of front wheels which are not in positional alignment with a pair of rear wheels.

7. The device of claim 1 wherein said cart includes wheels which are in positional alignment.

8. The device of claim 2 wherein said lifting apparatus includes a system of interconnected pulleys and cables.

9. The device of claim 2 wherein said lifting apparatus includes a plurality of interconnected chains and sprockets or gears and shafts.

10. A cart return system comprising:
    a two-tiered rail system having a set of parallel feed rails and a set of parallel return rails positioned below said feed rails;
    said feed and return rails defining an unloading front end and a loading rear end;
    at least one cart having wheels for rolling engagement with said feed rails and said return rails of said two-tiered rail system;
    said feed rails and said return rails adapted to permit said cart to move from rolling engagement with said feed rails to rolling engagement with said return rails; and
    said two-level rail system adapted to allow said cart to be unloaded at said front end and returned to said rear end where said cart is lifted up to said feed rails at said rear end for the loading of said cart.

11. A cart return system comprising:
    a two-tiered rail system having a set of parallel feed rails and a set of parallel return rails positioned below said feed rails;
    at least one cart having wheels for rolling engagement with said feed and return rails;
    a means for transferring said cart from rolling engagement with said feed rails to rolling engagement with said return rails;
    a liftable support located below said feed rails and rearward of said return rails for holding said cart; and
    a lifting apparatus which raises said liftable support up to said feed rails for the transfer of said cart to said feed rails.

12. The device of claim 11 wherein said transfer means includes a plurality of notches located on said feed rails.

13. The device of claim 12 wherein said transfer means further includes a plurality of transfer ramps.

14. The device of claim 11 wherein said lifting apparatus includes a plurality of interconnected pulleys and cables.

15. The device of claim 11 wherein said lifting apparatus includes a plurality of interconnected chains and sprockets or gears and shafts.

16. The device of claim 11 further adapted to use the weight of a loaded cart to power said lifting apparatus.

17. The device of claim 11 wherein said cart has a pair of front wheels which are not in positional alignment with a pair of rear wheels.

18. The device of claim 11 wherein said cart includes wheels which are in positional alignment.

19. A cart return system comprising:
    a pair of parallel spaced feed rails having first sections separated from second sections by first transfer apertures;
    a pair of parallel spaced return rails located below said first sections of said feed rails;
    said first sections having a first set of transfer ramps, at least one feed rail stop, notches, and a second set of transfer ramps;
    a pair of swing bridges for connecting said first sections with said second sections;
    said return rails including at least one return rail stop;
    at least one cart having wheels for rolling engagement with said feed rails and said return rails;
    a liftable support located below said second sections of said feed rails and rearward of said return rails and adapted to hold and lift said cart;
    a lifting apparatus for raising said support from a down position to an up position for the transfer of said cart to said feed rails; and
    said first and second transfer ramps and said notches adapted to permit said cart to move from rolling engagement with said feed rails to said return rails.

20. The device of claim 19 wherein said lifting apparatus is connected to said first transfer ramps and adapted to use the weight of a cart, when loaded, to lift said support up to said feed rails for the transfer of said cart to said feed rails.

21. The device of claim 20 wherein said lifting apparatus is a plurality of interconnected pulleys and cables.

22. The device of claim 20 wherein said lifting apparatus is a plurality of interconnected sprockets and chains or gears and shafts.

23. The device of claim 19 further including a dampener for controlling the descent of said cart from said feed rails to said return rails.

24. The device of claim 19 wherein said cart has a pair of front wheels which are not in positional alignment with a pair of rear wheels.

25. The device of claim 19 wherein said cart includes wheels which are in positional alignment.

* * * * *